March 28, 1967 R. E. DAVIS ETAL 3,310,905
FISHING TACKLE BOX
Filed Jan. 3, 1966
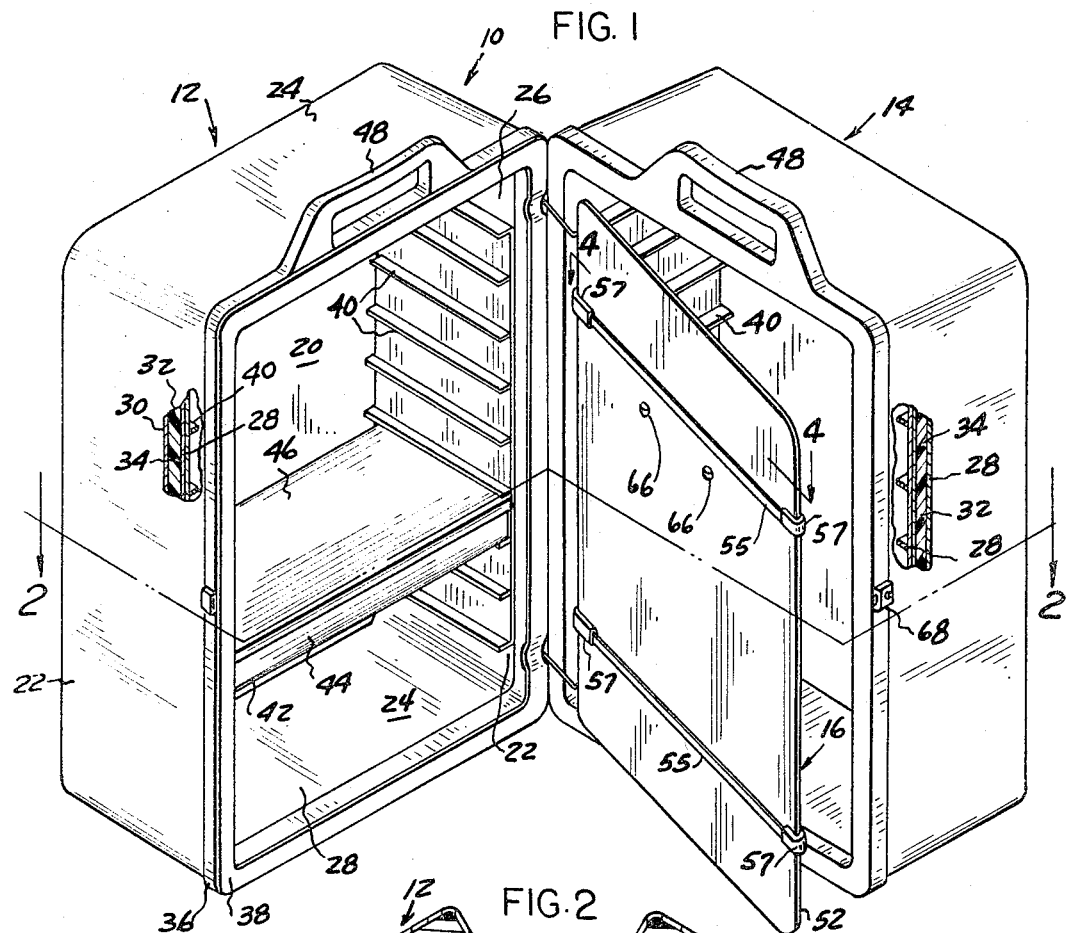
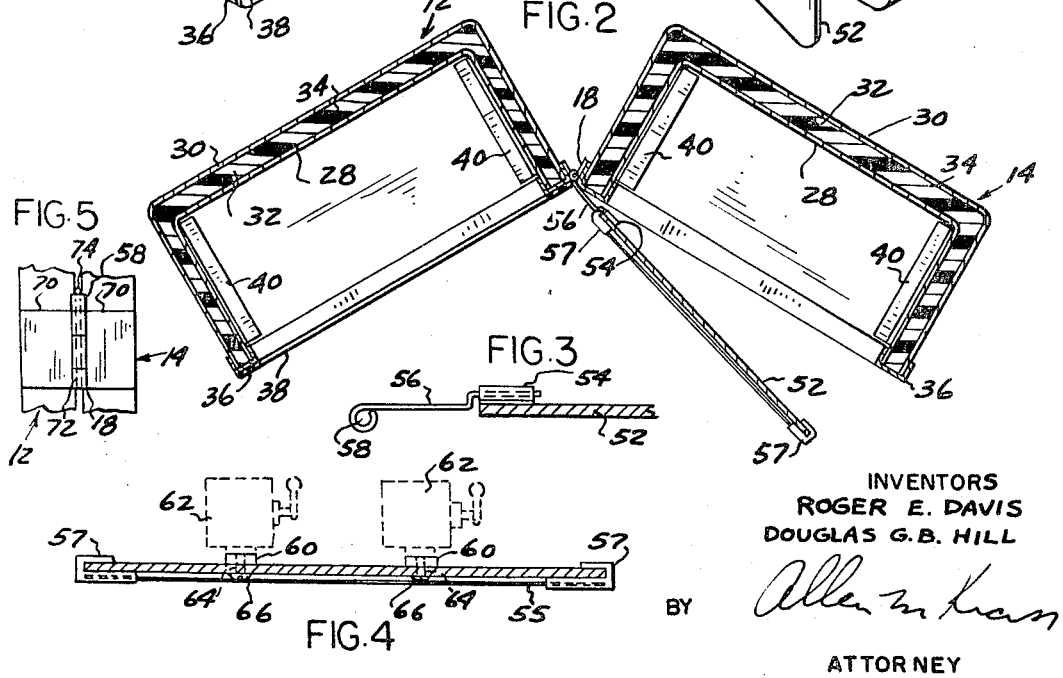
INVENTORS
ROGER E. DAVIS
DOUGLAS G.B. HILL
BY
ATTORNEY

United States Patent Office 3,310,905
Patented Mar. 28, 1967

3,310,905
FISHING TACKLE BOX
Roger E. Davis, 411 N. Elmwood, and Douglas G. B. Hill, 331 Grandview Parkway, both of Traverse City, Mich. 49684
Filed Jan. 3, 1966, Ser. No. 518,449
5 Claims. (Cl. 43—57.5)

This invention relates to a box for retaining fishing tackle and the like in such a manner that a relatively large quantity of tackle may be easily transported and may be selectively removed from the box for use without exposing all of the contents of the box.

Conventional tackle boxes employ a rectangular container formed of sheet metal and consisting of a flat bottom with four upstanding sides and an open top. A cover member for the top consists of a similar rectangular box having shallower sides, which is hinged to the top of one of the upstanding sides of the main box so that it may be disposed in either a closed position, wherein the member covers the main box, or an open position wherein the box is supported on its base with the concave surfaces of both the main box and the cover exposed. A compartmented tray is often supported between the main box and the cover so that it swings into the main box when the unit is closed and is supported by the main box in a horizontal position when the cover is open.

The present invention relates to a tackle box which is useful for the same purposes as such conventional boxes and provides many advantages over them. One problem associated with convential boxes is that all of the contents are exposed when the box is open so that if the box becomes accidentally upset the entire contents become disarrayed. Another problem associated with the conventional box is that it is intended to permanently store the major part of its contents and it is necessary to carry a large amount of tackle which is not useful for the particular fishing expedition at hand.

The present invention solves this and other problems by providing a box which, in the preferred embodiment, consists of two identical sections having rectangular bottoms, normally extending sides and open tops. Each of these halves is formed of a double shell plastic construction with a light weight foam filling the space between the shells. The two sections are hinged together on one of the long sides so that they may be disposed in either an open or closed position. A flexible gasket extends around the open edge of at least one of the boxes so that when the two are in a closed position, they form a completely sealed, water tight unit. The foam construction provides the box with such a low specific gravity that the closed unit will float when filled with a reasonable amount of fishing gear.

The opposed inner surfaces of the long sides of each of the two sections support a series of regularly spaced, transversely extending short rails or guides. These guides extend the full width of each long side in a direction perpendicular to the extension of the hinge between the two sections. The guides are disposed in opposition to one another and are adapted to support plastic parts boxes which have a length and width similar to the container sections and a depth equal to the spacing between the pair of guides so that they may be stored within a container section between two pair of opposed guides on each side. Thus, a large number of these plastic boxes may have their own removable covers and they are inserted and retracted into the box sections from the open sides in a direction perpendicular to the hinge.

With this construction, the box is adapted to be supported in an open position on the ends of the two sections with the hinge vertical so that the plastic boxes are arrayed horizontally. Any one of the boxes may be withdrawn from its containing section in the manner of a drawer and opened to expose its contents. Only one of the contents of any one box is exposed at a time. With this removable drawer arragement, the fisherman may arrange his tackle into a large number of the plastic boxes for storage in a central location and may place only those boxes which he intends to use with him in the tackle box for use during a fishing trip. The drawers may be arranged in the guides with varying separation between them so that access may be had to the top of a drawer without removing the entire drawer.

The edges of the short sides of the sections, opposite to those on which the unit is supported when in an open position, carry extending handles which move together when the box is in a closed position to form a single unitary handle that may be grasped to carry the box.

The preferred embodiment of the tackle box also includes a flat partition member which is generally rectangular and has dimensions similar to but slightly smaller than the box sections. This partition is pivotably supported in a movable manner on the same hinge which retains the box sections together. When the section box is closed it is supported between the two sections and when the boxes are open the partition panel may be pivoted between the box sections so as to gain access to either side. The partition is adapted to support items such as reels and a number of elongated resilient retainers having clips on their ends which allow them to be stretched across the width of the partition panel for retaining hooks, lures, leaders and the like. A suitable lock or latch mechanism is provided to retain the boxes in their closed condition against accidental opening.

This preferred embodiment of the tackle box allows only a small portion of the contents to be exposed so as to avoid the possibility of accidentally spilling out all of the contents or getting them wet. Another advantage of the present unit is that it requires much less floor space than conventional tackle boxes since it rests on the small end of the box rather than on the flat base. The provision of twin boxes both adapted to rest on their short bases at angles to one another, provides the unit with even more stability than the conventional unit with its larger base.

It is therefore seen to be a primary object of the present invention to provide a fishing tackle box consisting of a pair of substantially identical rectangular boxes having one of their large faces open, the two halves being joined by a hinge extending along the side, with a plurality of drawers being supported in the boxes and being insertable into and out of the boxes along a line perpendicular to the axis of the hinge.

Another object is to provide such a tackle box wherein the drawers may consist of individual boxes retained in two tackle box halves on guides formed on the interior opposed sides of the boxes.

Another object is to provide such a tackle box wherein a partition panel having an outer configuration similar to the box halves is supported on the same hinge between the boxes and serves to support a variety of tackle as well as retaining the drawings in their closed position when the box is closed.

Other objects, advantages and applications of the present invention will be made apparent by the following detailed description of a preferred embodiment of the invention. The description makes reference to the accompanying drawings in which:

FIGURE 1 is a perspective view of a fishing tackle box representing a preferred embodiment of the present invention;

FIGURE 2 is an enlarged sectional view of the fishing box taken along line 2—2 of FIGURE 1;

FIGURE 3 is a detail view of the partition hinging arrangement;

FIGURE 4 is an enlarged sectional view of the partition as taken along line 4—4 of FIGURE 1; and FIGURE 5 is a view of the hinge with parts removed for purposes of clarity.

Now, referring to FIGURE 1, a preferred fishing tackle box 10 generally comprises two identical open box-like sections generally indicated at 12 and 14, respectively, and a flat partition 16 joined together by hinge means 18. As can best be seen in FIGURES 1 and 2, the box section 12 comprises a rectangular bottom 20, a pair of normally extending long sides 22 and a pair of normally extending short sides 24. The long sides 22 and short sides 24 define an open top 26. The bottom 20, long sides 22 and short sides 24 are formed of a double shell plastic construction comprising an inner shell 28 and an outer shell 30 defining a space 32. The space 32 is preferably filled with a light weight foam 34 adapted to provide rigidity to the double shell box 24. A peripheral element 36 seals the space 32 between the inner shell 28 and the outer shell 30.

The box section 14 is formed of a double shell construction identical to the box 12. The two box sections 12 and 14 are pivotably hinged to one another along one of the long sides 22 by the hinge 18 so that they may be disposed in either an open or a closed position. The peripheral element 36 of box section 12 is provided with a flexible gasket 38 which extends around the element 36 so that when the box sections 12 and 14 are in the closed position, the gasket 38 assists in forming a completely sealed, water-tight fishing box 10.

The exposed inner surfaces of the long side inner shells 28 of each of the two box sections 12 and 14 support a plurality of transversely extending flat, elongated guides 40. The guides 40 extend the full width of each long side 22 in a normal direction to the extension of the hinges 18 between the two box sections 12 and 14. The guides 40 are preferably equi-spaced and disposed in opposition to one another and are adapted to support one or more conventionally sized plastic parts containers 42. The plastic parts container 42 preferably comprises a box 44 and a removable cover 46 and may be inserted into and withdrawn from the box sections 12 and 14 from the open sides 26 in a direction perpendicular to the hinges 18. The guides 40 may alternately be fixed to the box sections 12 and 14 with a varying interval so that access may be had to the parts container 42 without withdrawing the entire container 42.

The fishing box 10 is normally supported in an open position on the short sides 24 so that the hinges 18 are disposed in a vertical position. An extending handle means 48 is fixed to the peripheral element 36 on the opposite short sides 24. The handles 48 are adapted to form a single unitary handle when the box 10 is in a closed position that may be grasped to carry the fishing box 10.

Referring to FIGURE 3, the partition 16 comprises a preferably flat and rectangular division member 52 formed with a pair of integral hinge blocks 54 which receives angular hinge straps 56. The hinge straps 56 are formed with an eye 58 which is adapted to be pivotably and removably connected to the hinge 18 in a manner presently to be described. The division member 52 is suitably dimensioned so that it does not interfere with the closing of the box sections 12 and 14.

A plurality of elongated and resilient retainers 55 formed with clip means 57 are adapted to be stretched so that the clips may engage opposite edges of division member 52. The retainers 55 provide a means for supporting hooks, lures and the like.

Now referring to FIGURE 4, the division member 52 is provided on the opposite side from the retainers 55 with a pair of elongated support blocks 60 preferably disposed parallel to one another and to the long edge of the division member 52 so as to provide a supporting means for one or more conventional type fishing reels 62. The support blocks 60 are provided with holes 64 adapted to receive screws 66 to secure the fishing reels 62.

A lock 68 is preferably provided on the outside of the peripheral elements 36 on the side opposite the hinges 18 which serves to secure the box sections 12 and 14 in a closed position. It can readily be apparent that any conventional type latch or other fastener means could be readily substituted for the lock 68.

Now referring to FIGURE 5, the hinges 18 each comprise a pair of straps 70 which are integrally fixed to the box sections 12 and 14 and are adapted to pivotably receive a vertical pin 72. The pin 72 is formed with a projecting end 74 which extends above the straps 70 and is adapted to receive the eye 58 of the division member hinge 56. The partition 16 is therefore removably pivotably on the hinge 18 and can be removed between the box sections 12 and 14 so as to allow access thereto.

It can therefore be seen that I have described an improved fishing tackle box formed of a lightweight plastic double shell construction that when closed will float when filled with the usual fishing paraphernalia. When the improved fishing box is open, the two halves provide a greatly increased supporting base over conventional type fishing boxes. The box may be provided with a plurality of individual and covered containers which slide on the guides formed on the interior of the box. Therefore, the entire contents of the box are not exposed when the box is open thereby minimizing the quantity of tackle that may be disarrayed in the event of an accidental upset. In addition, the fishing box can also be utilized to carry the more bulky equipment such as reels and the like which are supported on the partition which is removably hinged on the same hinges as the box halves.

It is apparent that although we have described but a single embodiment of the present invention, many changes and modifications can be made therein without departing from the spirit of the invention as expressed by the scope of the appended claims.

Having described our invention, we claim:

1. A hand carried container useful in transporting relatively small fishing articles such as hooks, flies and the like and relatively large fishing articles such as fishing reels, comprising:

(a) means defining an article carrying compartment, comprising:

(1) a pair of generally rectangular box halves, each having a bottom, four sides extending normally from the bottom and an open top;

(2) hinge means pivotally connecting the edge of one side of each half adjacent their open tops so that the two halves may be disposed between a first position wherein the edges defining their open tops are in abutment to define a closed compartment, and a second position wherein the open tops are separated from one another to provide access to a portion of said compartment;

(b) means associated with said compartment for supporting in a classified arrangement a plurality of relatively small articles and permitting accessibility of selected classifications of said small articles, said means comprising:

(1) a series of guideways in each of said box halves, said guideways disposed at regularly spaced intervals one above the other when said container is in its upright position, each of said guideways comprising a pair of guides extending along opposite interior sides of each of said box halves and perpendicular to the hinge axis of said box halves;

(2) a plurality of similarly shaped article containers each having a width slightly less than the interior dimensions between the guide supporting sides of each box half, a thickness corresponding to the spacing between each pair of guideways, and the containers on at least one side having a depth slightly less than the corresponding depth of its associated box half to accommodate a partition when the box halves are closed, whereby each of said article containers may be inserted between two adjacent guideways to serve as a drawer and slidably removed from its guideways in directions perpendicular to the hinge axis of said box halves;

(c) means associated with said compartment for supporting relatively large articles, comprising:
  (1) a partition supported for pivotal movement about an axis adjacent the edges of said box halves supporting said hinge means and movable between the open tops of said box halves when said halves are separated from one another between positions adjacent the open top of one of said box halves and permitting access to the opposite of said box halves, said partition being adapted to support fishing articles which project into one of said box halves when the partition is in a position adjacent the open top of said one of said box halves by removing selected article containers from the guideways in said one of said box halves which interfere with the reception of said projecting fishing articles; and (d) means for locking said box halves one to the other when their open tops are in abutment.

2. The container of claim 1 wherein the guides are disposed at regular intervals with respect to one another so that transparent container drawers may be disposed between any set of pairs of guides.

3. The container of claim 1 wherein each box half is formed of sheet plastic walls and the abutment edges of the halves are joined in sealed relationship in their abutting position in order to form a water-tight floatable structure.

4. The container of claim 1, including handle means for carrying the box halves so that said part containers are disposed one above the other.

5. The container of claim 4, wherein said locking means are carried by the sides of said box halves perpendicular to the sides carrying said handle means.

References Cited by the Examiner

UNITED STATES PATENTS

| | | | |
|---|---|---|---|
| 1,440,948 | 1/1923 | Aiken. | |
| 1,757,227 | 5/1930 | Wheary | 312—199 |
| 2,558,124 | 6/1951 | Burden | 43—54.5 |
| 2,588,957 | 3/1952 | Brown | 312—200 |
| 2,634,541 | 4/1953 | Adams | 43—57.5 |
| 2,723,896 | 11/1955 | Wurtz | 312—296 |
| 2,763,957 | 9/1956 | Roberts | 43—57.5 |
| 2,798,615 | 7/1957 | Klappert et al. | 248—361 |
| 3,115,723 | 12/1963 | Kline | 43—57.5 |

FOREIGN PATENTS

| | | |
|---|---|---|
| 1,028,058 | 2/1953 | France. |

SAMUEL KOREN, *Primary Examiner.*

D. J. LEACH, *Assistant Examiner.*